United States Patent
Yoshino (10) Patent No.: US 7,750,968 B2
(45) Date of Patent: Jul. 6, 2010

(54) IMAGE PROCESSING APPARATUS, IMAGE PROCESSING METHOD, PROGRAM, AND STORAGE MEDIUM

(75) Inventor: Hiroaki Yoshino, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1309 days.

(21) Appl. No.: 11/196,925

(22) Filed: Aug. 4, 2005

(65) Prior Publication Data

US 2006/0038908 A1 Feb. 23, 2006

(30) Foreign Application Priority Data

Aug. 18, 2004 (JP) .............................. 2004-238443

(51) Int. Cl.
*H04N 5/225* (2006.01)
*G02B 13/16* (2006.01)

(52) U.S. Cl. ..................... 348/335; 348/220.1; 348/340; 348/345; 348/348

(58) Field of Classification Search .............. 348/220.1, 348/222.1, 335, 340, 345, 348, 370, 372; 359/362, 368, 372, 431, 434

See application file for complete search history.

(56) References Cited

U.S. PATENT DOCUMENTS 6,741,280 B1 5/2004 Shioji
2003/0071904 A1* 4/2003 Karasaki et al. .......... 348/231.3

FOREIGN PATENT DOCUMENTS

| JP | 11-275426 | | 10/1999 |
| JP | 11-308490 | | 11/1999 |
| JP | 2001211373 A | * | 8/2001 |
| JP | 2002-223413 | | 8/2002 |
| JP | 2004-056199 | | 2/2004 |

* cited by examiner

*Primary Examiner*—Yogesh K Aggarwal
(74) *Attorney, Agent, or Firm*—Canon USA Inc IP Div (57) ABSTRACT

An image processing apparatus is adapted to enlarge and display, in a case where image advancing is performed after an image is enlarged and displayed, a subsequent image while maintaining an enlargement position and an enlargement magnification set for the enlarged and displayed image if the subsequent image has a predetermined image attribute.

18 Claims, 7 Drawing Sheets

IMAGE PROCESSING APPARATUS, IMAGE PROCESSING METHOD, PROGRAM, AND STORAGE MEDIUM

CROSS REFERENCE TO RELATED APPLICATIONS

This application claims the benefit of U.S. Patent Application No. 2004/0165087, filed Feb. 13, 2004, which claims priority to Japanese Application 2003-047959, filed Feb. 25, 2003, and U.S. Patent Application No. 2004/0169760, filed Sep. 2, 2004, which claims priority to Japanese Application 2003-051307, filed Feb. 27, 2003, the entire contents of which are incorporated by reference herein.

BACKGROUND OF THE INVENTION

1. Field of the Invention

The present invention relates to technology for displaying plural images, which are recorded on a recording medium, in an image processing apparatus.

2. Description of the Related Art

Image processing apparatuses, such as an electronic camera, adapted to record and reproduce still images and moving images by utilizing a memory card having a solid-state memory device as a recording medium, have been commercially available. Also, electronic cameras having an electronic finder, such as a color liquid crystal panel, have been commercially available. These electronic cameras enable users to determine a picture composition by continuously displaying an image before the image is taken, and to check the image by reproducing and displaying the taken image.

Also, known are electronic cameras having, after an image is enlarged and displayed, a predetermined operating member allowing the user to thereby move an enlarged part of the image which is currently enlarged and displayed. Consequently, while the taken image is displayed, a user can enlarge and display any part of the image by using this operating member. Thus, the user can check whether the image is in focus. Such electronic cameras having this function are disclosed in Japanese Patent Application Laid-Open Nos. 11-275426 (corresponding to U.S. Pat. No. 6,741,280) and 11-308490.

However, for example, in a case where plural images taken by continuous shooting are collectively checked regarding whether the images are in focus, a conventional operating section adapted to perform an image display function is complex. Sometimes, it is very cumbersome to operate the operating section. That is, it is necessary to perform the following operation by using many operating members. First, a displayed image is enlarged. Then, an enlargement position is moved. Thereafter, in a case where another image is enlarged, the enlargement of the displayed image is canceled. Subsequently, image advancing is performed. Then, another image is enlarged.

SUMMARY OF THE INVENTION

The present invention is directed to an image processing apparatus configured to simplify an operating section, which is adapted to move an enlargement position and to perform image advancing, and also configured to considerably enhance operability. Also, the present invention provides an image display method, program, and a storage medium that corresponds to such an image processing apparatus.

In one aspect of the present invention, an image processing apparatus adapted to display images recorded on a recording medium includes: a display unit configured to display views of images including a first view of an image and a second view of the image in which a selected position on the image is enlarged at a magnification; a mode setting unit facilitating setting modes of the display unit including a normal view mode in which the display unit displays images in the first view, an enlargement view mode in which the display unit displays images in the second view, and an enlarged image advancing mode; an image advancing unit operative to advance a sequential image with respect to a current image for display on the display unit; a determining unit determining an image attribute of images, including first and second image attributes; and a control unit controlling the display unit such that in the enlarged image advancing mode, the display unit displays the sequential image at the second view responsive to the determining unit determining that the sequential image has the first image attribute.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Hereinafter, an embodiment of the invention is described in detail with reference to the accompanying drawings.

Figure 1:
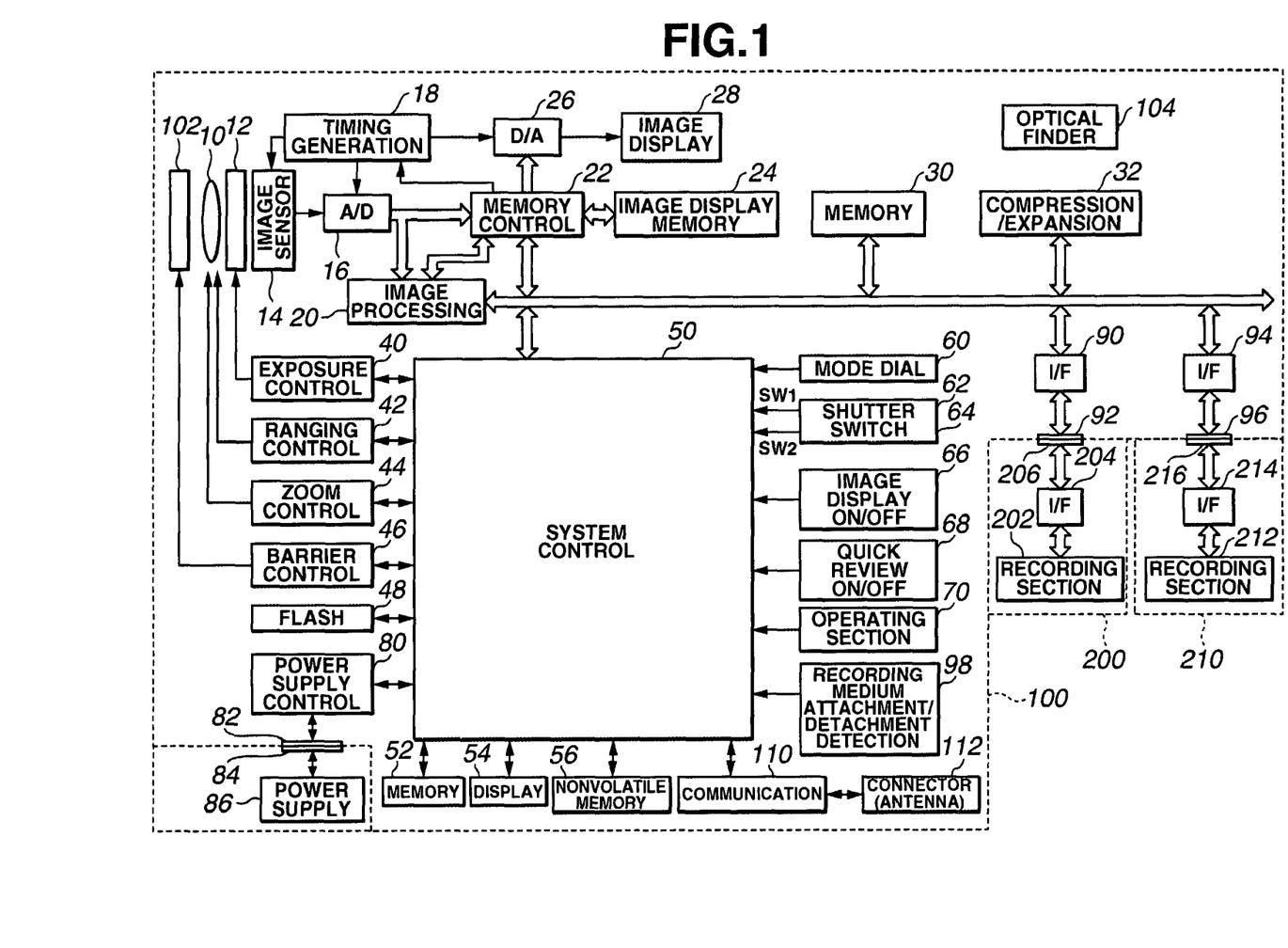
FIG. 1 is a block diagram showing the configuration of an image processing apparatus according to an embodiment of the present invention.

FIG. 1 is a block diagram showing the configuration of an image processing apparatus according to one embodiment of the present invention. In FIG. 1, reference numeral 100 designates the image processing apparatus. In this embodiment, the image processing apparatus is an electronic camera.

Reference numeral 10 designates an imaging lens. Reference numeral 12 denotes a shutter having a stop function. Reference numeral 14 designates an image pickup device adapted to convert an optical image to an electric signal. Reference numeral 16 denotes an A/D converter adapted to convert an analog signal to a digital signal. Reference numeral 18 designates a timing generation circuit adapted to supply clock signals and control signals to the A/D converter 16 and a D/A converter 26. The timing generation circuit 18 is controlled by a memory control circuit 22 and a system control circuit 50.

Reference numeral 20 denotes an image processing circuit adapted to perform predetermined pixel interpolation processing and predetermined color conversion processing on data from the A/D converter 16 or from the memory control circuit 22. The image processing circuit 20 performs predetermined calculation processing by using image data of a picked-up image. The system control circuit 50 performs AF (Auto Focus) processing with the TTL (Through-The-Lens) method, AE (Auto Exposure) processing, and EF (Pre-flash) processing according to the calculation processing to thereby control an exposure control circuit 40 and a ranging control circuit 42. The image processing circuit 20 performs the predetermined calculation processing by using the image data of the picked-up image and performs AWB (Auto White Balance) processing with the TTL method according to the obtained result of the calculation.

The memory control circuit 22 is adapted to control the A/D converter 16, the timing generation circuit 18, the image processing circuit 20, an image display memory 24, the D/A converter 26, a memory 30, and a compression/expansion circuit 32. Data outputted from the A/D converter 16 is written to the image display memory 24 through the image processing circuit 20 and an memory control circuit 22 or written to the memory 30 through the memory control circuit 22.

Reference numeral 28 denotes an image display section including a TFT LCD and so on. Image data written to the image display memory 24 is displayed by the image display section 28 through the D/A converter 26.

Image data of a picked-up image are sequentially displayed by the image display section 28. Thus, an electronic finder function can be realized. The image display section 28 is enabled to optionally turn on/off in response to instructions issued by the system control circuit 50. In a case where the display of the image is turned off, the power consumption of the image processing apparatus 100 can considerably be reduced.

The memory 30 is operative to store taken still and moving images, and has memory capacity sufficient to store data representing a predetermined number of still images and moving images reproduced for a predetermined time. Consequently, even in continuous shooting of plural still images or in panoramic photographing, a large amount of image data can be written to the memory 30 at a high speed. Also, the memory 30 can be used as a work area for the system control circuit 50.

The compression/expansion circuit 32 performs compression/expansion on image data by adaptive discrete cosine transformation (ADCT) or the like. The compression/expansion circuit 32 reads image data stored in the memory 30 and subsequently performs compression/expansion on the read image data. Then, the compression/expansion circuit 32 writes resultant data to the memory 30.

The exposure control circuit 40 controls the shutter 12 having the stop function. Also, the exposure control circuit 40 cooperates with a flash unit 48 to thereby have a flash dimming function. The ranging control circuit 42 controls the focusing of the imaging lens 10. Reference numeral 44 denotes a zoom control circuit adapted to control zooming of the imaging lens 10. Reference numeral 46 designates a barrier control circuit operative to control an operation of a protection member 102 serving as a barrier. The flash unit 48 has an AF auxiliary light projection function and flash dimming function.

The exposure control circuit 40 and the ranging control circuit 42 are controlled by the TTL method. The system control circuit 50 controls the exposure control circuit 40 and the ranging control circuit 42 according to a result of calculation performed on image data by the image processing circuit 20. The system control circuit 50 controls the entire image processing apparatus 100. Reference numeral 52 denotes a memory adapted to store constants, variables, programs, and the like for operating the system control circuit 50.

Reference numeral 54 designates a display section, such as a liquid crystal display apparatus or a loudspeaker, which display and output operating states, messages, and the like by using characters, images, voices, and the like in response to execution of a program in the system control circuit 50. One or plural display units 54 are arranged at easily viewable positions near the operation section of the image processing apparatus 100. Each display section 54 includes a combination of an LCD, LED, a sounding device, and the like.

Sections adapted to perform some functions of the display section 54 are provided in an optical finder 104. Among indications displayed in the display section 54, those displayed in the LCD or the like include single-shot/continuous-shooting, a self timer, a compression ratio, number of recording pixels, the number of recorded images, number of remaining recordable images, a shutter speed, a diaphragm value, exposure compensation, flash illumination, red-eye reduction, macro photographing, buzzer-setting, a remaining timer-battery level, a remaining battery level, an error, information represented by plural digit numbers, attached/detached states of recording media 200 and 210, an operation of a communication I/F, and date/time.

Among indications displayed in the display section 54, those displayed within the optical finder 104 include a focused state, a camera-shake warning, a flash charge, a shutter speed, a diaphragm value, and exposure compensation.

Reference numeral 56 denotes an electrically erasable and recordable nonvolatile memory. For example, an EEPROM is used as the nonvolatile memory 56. Reference numerals 60, 62, 64, 66, 68, and 70 denote operating devices used for inputting various operation instructions to the system control circuit 50. The operating devices 62, 64, 66, 68, and 70 include one or plural combinations of switches, dials, touch panels, a pointing device utilizing line-of-sight detection, a voice recognition device, and the like.

Hereinafter, these operating devices are described more specifically. Reference numeral 60 designates a mode dial switch that switches and sets each of function modes, such as a power-off mode, an automatic photographing mode, a photographing mode, a panoramic photographing mode, a reproduction mode, a multiple screen reproducing/erasing mode, and a PC connection mode.

Reference numeral 62 designates a shutter switch SW1, which is turned on in the middle of an operation of a shutter button (not shown). This switch instructs the starting of operations, such as an AF (Auto focus) process, an AE (Auto-Exposure) process, an AWB (Auto-White-Balance) process, and an EF (Pre-flash) process.

Reference numeral 64 denotes a shutter switch SW2, which is turned on when an operation of a shutter button (not shown) is completed. This switch SW2 instructs the starting of a sequence of processes. The sequence of processes includes an exposure process of writing data represented by a signal, which is read from the image pickup device 14, to the memory 30 as image data through the A/D converter 16 and the memory control circuit 22. Also, the sequence of processes includes a development process utilizing computations in the image processing circuit 20 and the memory control circuit 22, and also includes a recording process of reading the image data from the memory 30, compressing the image data by the compression/expansion circuit 32, and writing the compressed image data to the recording medium 200 or 210.

Reference numeral 66 designates an image display on/off switch that can set the turning-on/off of the image display section 28. This switch is enabled to cut off the supply of electric current to the image display section 28 formed of TFT LCDs and the like so as to save the power consumption thereof.

Reference numeral 68 designates a quick review on/off switch that sets a quick review function for automatically reproducing image data of a taken image immediately after the image is taken. Incidentally, this embodiment is assumed to have a function of setting a quick review function, especially, in a case where the image display section 28 is turned off.

Reference numeral 70 denotes an operating section including various buttons, a touch panel, and the like. The operating section 70 has functions of, for example, a menu button, a set button, a macro button, a multiple screen reproduction newpage button, a flash setting button, a single shot/continuous shooting/self-timer switching button, a menu movement+ (plus) button, a menu movement−(minus) button, a reproduced image movement+(plus) button, a reproduced image movement−(minus) button, a photographing image-quality selection button, an exposure correcting button, and a date/time setting button.

Reference numeral 80 designates a power supply control circuit including a battery detection circuit, a DC-DC converter, and a switch circuit adapted to switch blocks to be energized. The power supply control circuit 80 detects the attachment/detachment of a battery, the battery type, and a battery power supply level. Also, the power supply control circuit 80 controls the DC-DC converter according to detection results and instructions issued from the system control circuit 50, and supplies a necessary voltage to components including the recording medium, for a necessary period of time. Reference numeral 82 denotes a connector. Reference numeral 84 designates another connector. Reference numeral 86 denotes a power supply section including a primary battery (e.g., an alkali battery or a lithium battery), a secondary battery (e.g., a NiCd battery, a NiMH battery, or an Li battery), and an AC adapter and the like.

Reference numerals 90 and 94 designate interface sections connected to recording media, such as a memory card and a hard disk. Reference numerals 92 and 96 denote connectors which establish connection to recording media as a memory card and a hard disk. Also, reference numeral 98 designates a recording medium attachment/detachment detection section adapted to detect whether the recording medium 200 or 210 is attached to the connectors 92 and/or 96.

Incidentally, this embodiment is described as having two systems including an interface section and a connector, to which the recording medium is attached. The apparatus may be configured to have any number of systems, that is, a single or plural systems each including an interface section and a connector, to which the recording medium is attached. Alternatively, the apparatus may be configured to have combinations of interfaces and connectors according to different standards.

Alternatively, the apparatus may be configured by using interfaces and connectors according to the standards of PCMCIA card, CF (CompactFlash (CompactFlash is a registered trademark)) card, or the like.

The apparatus may be configured by using the interface sections 90 and 94 and the connectors 92 and 96 according to the standards of the PCMCIA card, the CF card, and the like. In this case, various types of communication cards, such as a LAN card, a modem card, a USB card, IEEE 1394 card, P1284 card, SCSI card, or a communication card for PHS are connected. Consequently, image data and management information attached thereto are transferred between the apparatus and each of other computers and peripheral devices, such as a printer.

The protection member 102 serves as a barrier adapted to prevent contamination and breakage of an image pickup section, which includes the imaging lens 10 of the image processing apparatus 100, by covering the image pickup section.

Images can be taken by using only the optical finder 104 without using the electronic viewfinder function implemented by the image display section 28. Displays adapted to perform some functions of the display section 54, for example, focusing indication, camera-shake warning indication, flash charging indication, shutter speed indication, diaphragm value indication, exposure correction indication and the like are provided in the optical finder 104.

Reference numeral 110 designates a communication circuit which has various communication functions of RS232C, USB, IEEE 1394, P1284, and SCSI devices, modems, LAN, or wireless communication devices. Reference numeral 112 denotes a connector for connecting the image processing apparatus 100 to other apparatuses by the communication circuit 110, or denotes an antenna in the case of performing wireless communication.

The recording medium 200 is, for example, a memory card, or a hard disk. The recording medium 200 has a recording section 202 constituted by a semiconductor memory, a magnetic disk, or the like, and also has an interface section 204 connected to the image processing apparatus 100, and a connector 206 connected to the image processing apparatus 100.

Similarly, the recording medium 210 is, for instance, a memory card, a hard disk, or the like. The recording medium 210 has a recording section 212 constituted by a semiconductor memory, a magnetic disk, or the like, and also has an interface section 214 connected to the image processing apparatus 100, and a connector 216 connected to the image processing apparatus 100.

Figure 2:
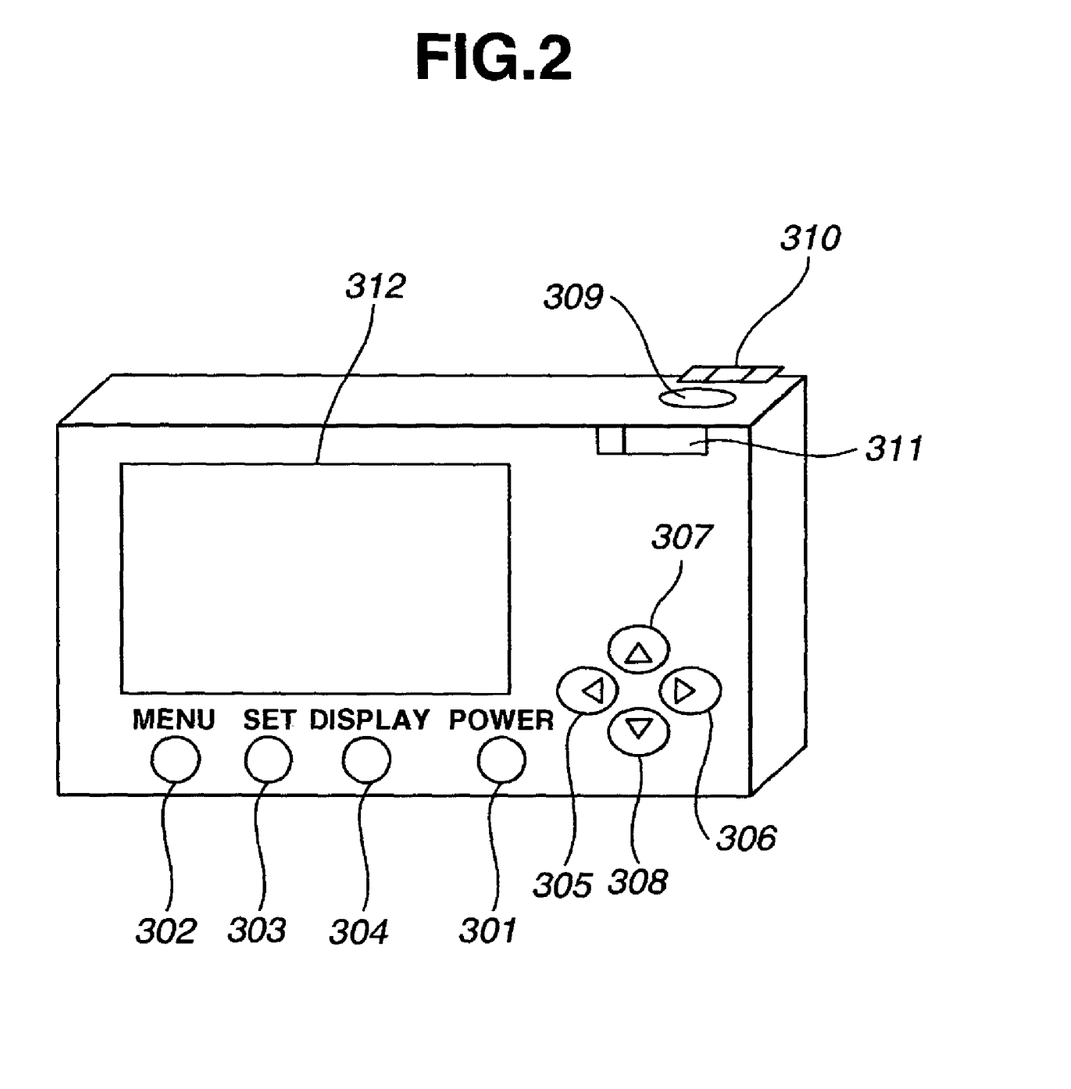
FIG. 2 is a diagram showing operating members of an electronic camera according to the embodiment.

An operation of this embodiment is described by referring to FIGS. 2 to 7. FIG. 2 is a diagram showing operating members of an electronic camera. A power button 301 is used for activating and deactivating the electronic camera. A "menu" button 302 is used for bringing up a menu of functions of changing imaging conditions, setting a date, protecting and deleting an image, and the like. This "menu" button is also used for finishing various set modes. A "set" button 303 is used for determining a selected item. In this embodiment, the "set" button is also used for changing each of functions assigned to up/down/left/right buttons 305 to 308 between an enlargement position moving function and an enlarged image advancing function. A "display" button 304 is used for switching between the display and the nondisplay of imaging information on an image or for switching between the display and the nondisplay of the electronic viewfinder. The "left" button 305 is used for leftwardly shifting the selected item or for image-advancing. The "right" button 306 is used for rightwardly shifting the selected item or for image-advancing. The "up" bottom 307 is used for upwardly shifting the selected item. The "down" bottom 308 is used for downwardly shifting the selected item. In a normal enlargement mode, the up/down/left/right buttons 305 to 308 are used for moving an enlargement position. A shutter button 309 is used for imaging in an imaging mode. A zoom button 310 is used for driving a zoom lens. The angle of view of an object to be imaged can be changed by leftwardly or rightwardly sliding the zoom button.

When an image is reproduced, the zoom button 310 also functions also as an enlargement button (to be described later). An operation mode is changed to an enlargement mode by sliding the zoom button to a wide angle side. The apparatus can get out of the enlargement mode by sliding the zoom button to a telephoto side in the enlarged mode. Incidentally, the apparatus may be adapted to set a corresponding relation between the number of sliding and an enlargement magnification to thereby enable a stepwise magnification adjusting operation. A mode changeover switch 311 is used for switching between a recording mode and a reproducing mode. A liquid crystal screen 312 is used in a case where an image is taken while being checked. The liquid crystal screen 312 is also used for checking the taken image.

Figure 3:
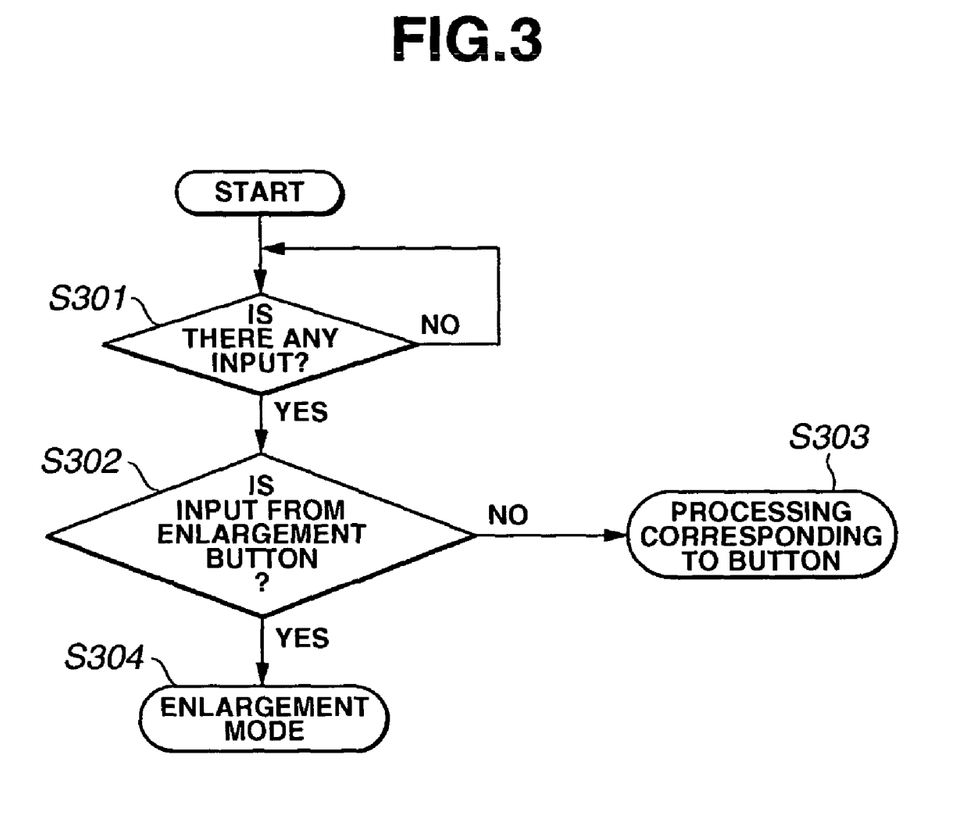
FIG. 3 is a flowchart showing a process of changing an operation mode to an enlargement mode according to the embodiment.

FIG. 3 is a flowchart showing a process of changing an operation mode of this embodiment to an enlargement mode. This process is performed under the control of the system control circuit 50.

First, it is determined in step S301 whether there is an input from the operating member. If not, the control circuit 50 waits for an input. If there is an input, it is determined in step S302 whether the input is from the enlargement button. If from a button other than the enlargement button, the process proceeds to step S303, whereupon processing corresponding to the button causing the input is performed. If from the enlargement button, the process advances to step S304, whereupon the operation mode is changed to the enlargement mode.

Figure 4:
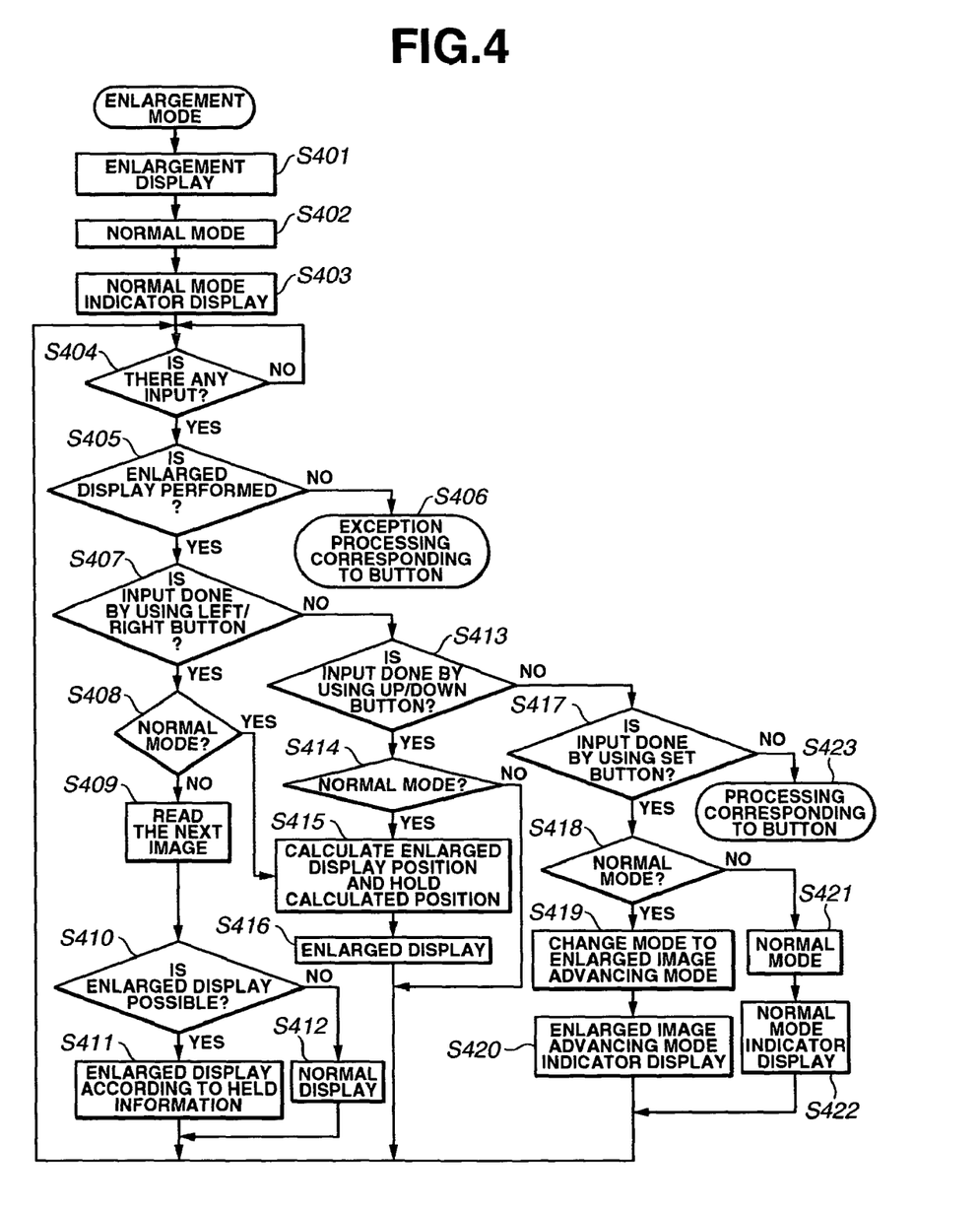
FIG. 4 is a flowchart showing a process performed after entering the enlargement mode according to the embodiment.

FIG. 4 is a flowchart showing a process after entering the enlargement mode according to the embodiment. This process is performed under the control of the system control circuit 50.

First, an image is enlarged and displayed in step S401. Subsequently, in step S402, a current enlargement mode is set to be a normal mode. The enlargement mode includes the normal mode and an enlarged image advancing mode. Then, an indicator indicating that the operation mode is the normal mode is displayed in step S403.

Upon completion of the enlargement display of the image, it is again determined whether there is the next input. That is, it is determined in step S404 whether there is an input from one of the operating members. If not, the control circuit 50 waits for an input. If there is an input, it is determined in step S405 whether a current image is enlarged and displayed. If not, the process proceeds to step S406, whereupon exception processing is performed. That is, for example, in a case where the process proceeds to this step in a normal display state (in step S412 or later) of a moving image (to be described later), processing in step S409 is performed by an input from the left button or the right button. The reproduction of the moving image is commenced by an input from the "set" button. In a case where image data representing the image is damaged or deleted, so that the image cannot be reproduced, similar processing is performed.

If in step S405 it is determined that the current image is enlarged and displayed, it is determined in step S407 whether the input is from the left button or the right button. If so, it is determined in step S408 whether the current enlargement mode is the normal mode. If the current enlargement mode is the enlarged image advancing mode instead of the normal mode, the next image is read in step S409. Then, it is determined in step S410 whether the read image can be enlarged. If so, in step S411, the image is enlarged and displayed according to enlargement information (to be described later).

If the image cannot be enlarged, the normal display thereof is performed in step S412. Subsequently, the process returns to step S404, whereupon the control circuit 50 waits for an input. If it is found in step S408 that the enlargement mode is the normal mode, an enlargement position is calculated in step S415. Then, the image is enlarged and displayed in step S416. Subsequently, the process returns to step S404, whereupon the control circuit 50 waits for an input.

If the input is from the "up" button or the "down" button in step S413, it is determined in step S414 whether the current enlargement mode is the normal mode. If so, an enlargement position is calculated in step S45. Then, enlargement information including the obtained enlargement position and the enlargement magnification is stored in the memory 52 in step S415. Subsequently, in step S416, the image is enlarged and displayed according to the enlargement information. Then, the process returns to step S404, whereupon the control circuit 50 waits for an input. If it is determined in step S414 that the current enlargement mode is the enlarged image advancing mode instead of the normal mode, the process returns to step S404, whereupon the control circuit 50 waits for an input.

If it is determined in step S417 that the input is from the "set" button, then it is determined in step S418 whether the current enlargement mode is the normal mode. If so, the enlargement mode is changed to the enlarged image advancing mode in step S419. Then, an indicator indicating that the current enlargement mode is the enlarged image advancing mode is displayed in step S420. Subsequently, the process returns to step S404, whereupon the control circuit 50 waits for an input. If it is determined in step S418 that the current enlargement mode is the enlarged image advancing mode, the current enlargement mode is changed to the normal mode in step S421. Then, an indicator indicating that the current enlargement mode is the normal mode is displayed in step S422. Subsequently, the process returns to step S404, whereupon the control circuit 50 waits for an input. If in step S417 it is determined that the input is from a button other than the up/down/left/right buttons and the "set" button, the process advances to step S423, whereupon processing to the button causing the input is performed.

Figure 5:
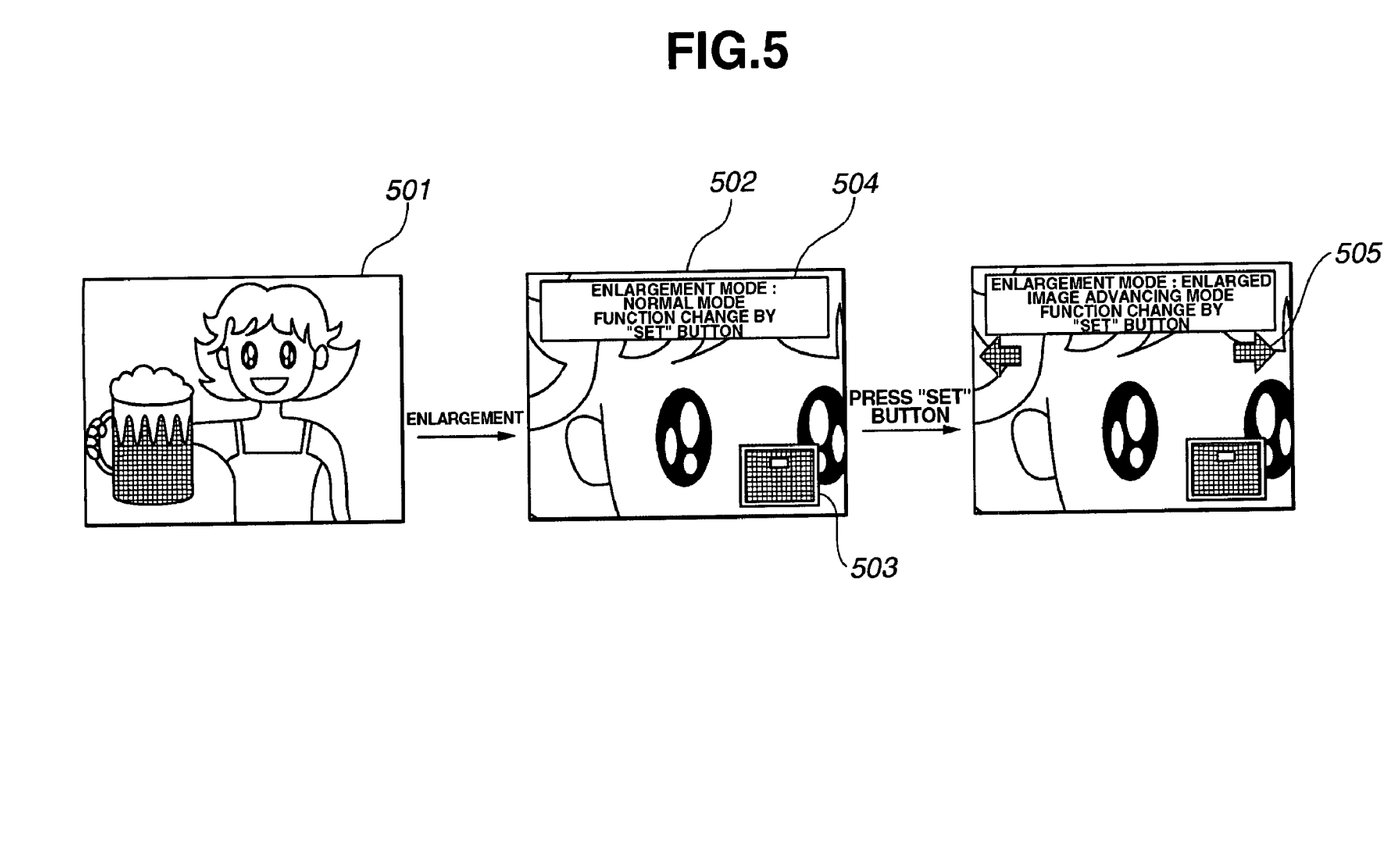
FIG. 5 is a diagram showing an example of a sequence of images displayed when performing image enlargement according to the embodiment.

FIG. 5 shows an example of a sequence of images displayed when performing image enlargement according to the embodiment. In this example, when the "enlargement" button is pushed in a state in which an image 501 is displayed, an enlarged image 502 is displayed. Then, an indicator 503, which indicates a current enlargement position, and an indicator 504, which indicates that the enlargement mode can be switched between the enlargement position moving function and the enlarged image advancing mode by the "set" button, are displayed together with this image 502. When the "set" button is pushed in this state, the function assigned to the left/right buttons is changed to the enlarged image advancing function. Then, an indicator 505, which indicates that the enlarged image advancing process can be performed by the left/right buttons, is displayed.

Figure 6:
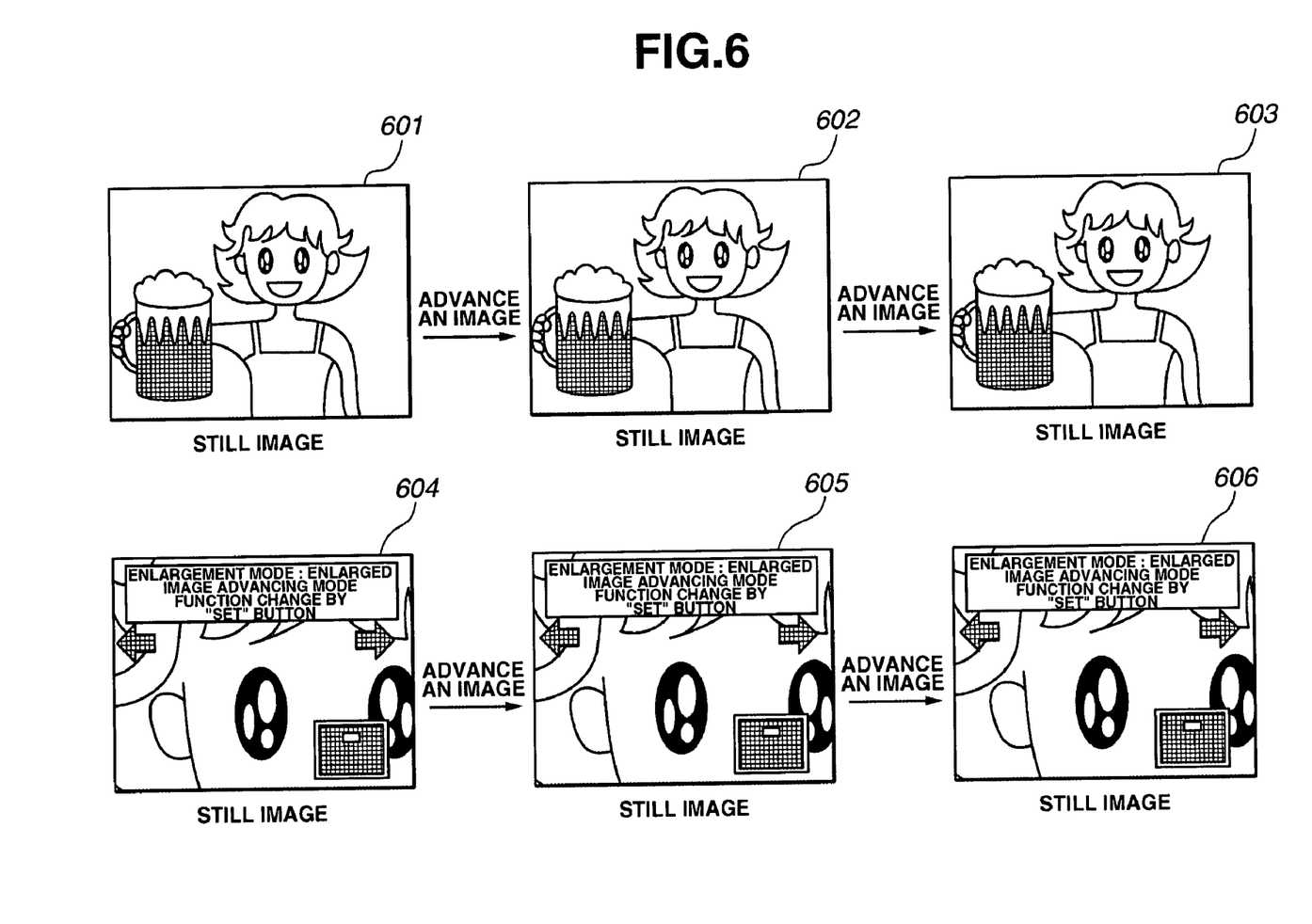
FIG. 6 is a diagram showing another example of a sequence of images displayed when performing image enlargement according to the embodiment.

FIG. 6 shows three still images obtained by continuous shooting. This figure illustrates a display operation of reproducing still images 601, 602, and 603 in this order. In a case where image advancing is performed without enlarging and displaying the image, the still image 601, the still image 602, and the still image 603 are displayed in this order.

Meanwhile, in a case where the "set" button is depressed in a state in which an image 604 obtained by enlarging the still image 601, so that the enlargement mode is changed to the enlarged image advancing mode, and where the execution of image-advancing is instructed, an image 605 obtained by enlarging the still image 602 can be displayed in the enlarged image advancing mode. In a case where the image advancing is further performed in such a state, a still image 606 obtained by enlarging the still image 603 is displayed.

At that time, as is apparent from the indication provided by an indicator in each of the images, the image advancing is performed by maintaining information representing the enlargement position and the enlargement magnification. Incidentally, in the foregoing description of this embodiment, the display of the plural images obtained by continuous advancing has been described by way of example. However, the display of plural images obtained by auto-bracket-shooting can be similarly performed.

Figure 7:
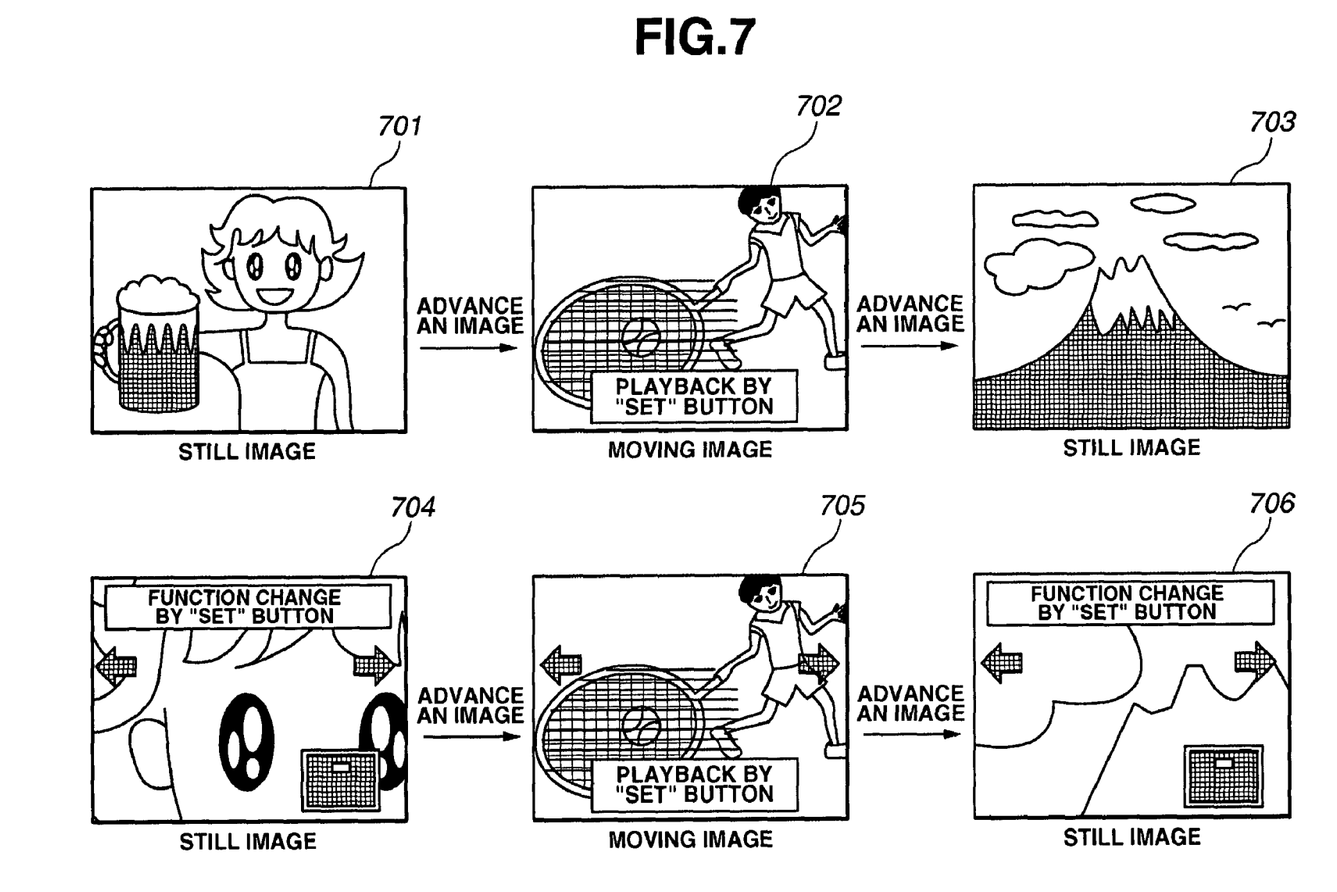
FIG. 7 is a diagram showing another example of a sequence of images displayed by the embodiment when performing image enlargement.

FIG. 7 is a diagram illustrating a display operation of reproducing a still image 701, a moving image 702, and a still image 703, which are independent of one another, in this order. In a case where image advancing is performed without enlarging and displaying the images, the still image 701, the still image 702 that is a representative frame (for example, a first frame) of the moving image, and the still image 703 are displayed in this order.

Meanwhile, in a case where the "set" button is depressed in a state in which an image 704 obtained by enlarging the still image 701, so that the enlargement mode is changed to the enlarged image advancing mode, and where the execution of image-advancing is instructed, the image 702 is not displayed being enlarged, because this embodiment is set so that moving images cannot be enlarged. Thus, an image similar to the moving image 702 is displayed. In a case where the image advancing is further performed in such a state, the next enlarged still image 706 is displayed by maintaining the enlarged image advancing mode. In this case, when a moving image is reproduced in a state in which the moving image is displayed, the apparatus exits the enlarged image advancing mode.

Although the apparatus of this embodiment is set to exit the enlarged image advancing mode when the moving image is reproduced, the apparatus sometimes can maintain the enlarged image advancing mode. That is, depending upon an operation performed in the enlarged image advancing state, the apparatus does not exit the enlarged image advancing mode. Although the apparatus of this embodiment is set to exit the enlarged image advancing mode when a moving image is reproduced, the apparatus may maintain this mode when one image is deleted.

Although this embodiment is adapted so that moving images cannot be enlarged by this embodiment and that thus, moving images are not displayed by being enlarged, the present invention is not limited to this embodiment. For example, even in a case where an image cannot be enlarged because image data representing this image is damaged or deleted, a similar control operation may be performed. In the above described embodiment, the image processing apparatus exits the enlarged image advancing mode when the attribute of the image is that it is a moving image. Alternatively, the present invention can detect other attributes of images, and depending on the detected attribute, the apparatus determines whether to exit the enlarge image advancing mode. For example, the apparatus can detect whether the images belong to a specific group of related images or a series of images taken. If the image does not have the attribute, the apparatus can exit the enlarged image advancing mode.

This embodiment employs the left/right buttons and the up/down buttons as the common members adapted to perform the enlargement position moving function and the enlarged image advancing function, and assigns the functions to the common members according to the enlargement mode so that each of the common members is used for performing the assigned function. However, the present invention is not limited to this embodiment. For example, the apparatus may be provided with separate members respectively dedicated to the functions and may control these members so that both the functions can be performed in each of the normal enlargement mode and the enlarged image advancing mode.

Although this embodiment employs the zoom button as the enlargement button for instructing the enlargement/display of an image, the enlargement button is not limited thereto. The apparatus may instruct the enlargement/display of an image by using the up/down button.

Although the apparatus of this embodiment does not exit the enlarged mode and continues to perform image-advancing when a moving image is displayed during the image advancing, the apparatus may be controlled to exit the enlargement mode after a moving image is displayed.

The size of the recorded images is not constant. There are images of various sizes, for example, 640×720 pixels, and 1200×1400 pixels. The image advancing may be performed on one sequence of such images of various sizes. In this case, the process shown in FIG. 4 is adapted so that, for instance, step S411 includes further a step of calculating an enlargement position from a ratio in size between the entire images. Also, the images are displayed according to results of the calculation to thereby enable the image advancing adapted so that the relative position in the entire image and the magnification are maintained.

In a case where the camera has a function of detecting the vertical/horizontal posture of a casing of the camera, an image of an object is taken by being assumed to rotating the object according to a result of detection. Thus, even when images of the same size are taken, images of different aspect ratios, for example, an image with 1200 pixels width and 1400 pixels height and another image with 1400 pixels width and 1200 pixels height are recorded. Even in this case, the process shown in FIG. 4 is adapted so that, for example, step S411 includes a step of calculating an enlargement position from a ratio in size between the entire images. Also, the images are displayed according to results of the calculation to thereby enable the image advancing adapted so that the relative position in the entire image and the magnification are maintained.

In a case where only one image is recorded on a recording medium, the apparatus may be adapted to disable the image advancing by restricting the assignment of the function to the operating members such as the left/right buttons and the up/down buttons so that images can be displayed only in the normal enlargement mode.

Needless to say, the features of the present invention can be achieved by providing a storage medium, on which a software program code enabled to implement the functions of the aforementioned embodiment is recorded, to a system or the apparatus, whose computer (or CPU or MPU) reads and executes the program code stored in the storage medium.

In this case, the program code itself read from the storage medium implements the functions of the aforementioned embodiment. Thus, the program code itself and the storage medium, which stores the program code, constitute the present invention.

For example, a flexible disk, a hard disk, an optical disk, CD-ROM, CD-R, magnetic tape, a nonvolatile memory card, and ROM may be employed as the storage medium for supplying the program code.

Additionally, the functions of the aforementioned embodiment are implemented not only by executing the read program code in the computer but by performing part or all of actual processing according to instructions, which are issued by the program code, by a basic system, that is, an OS (Operating System) running on the computer.

Needless to say, the functions of the aforementioned embodiment are also implemented by performing part or all of the actual processing by a CPU or the like, which is provided in a function expansion board inserted into the computer or in a function expansion unit connected to the computer, according to instructions issued by the program code that is read from the storage medium after written to a memory provided on the function expansion board or on the function expansion unit.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-238443 filed Aug. 18, 2004, which is hereby incorporated by reference herein in its entirety.

What is claimed is:

1. An image processing apparatus adapted to display plural images recorded on a recording medium, comprising:
   an enlargement display unit for enlarging and displaying an image recorded on the recording medium;
   a storing unit for storing enlargement information including an enlargement position used for enlarging and displaying the image;
   an enlargement position moving unit for moving the enlargement position of the enlarged and displayed image;
   an image advancing instruction unit for instructing image advancing;
   a determining unit for determining whether a next image to be displayed should be enlarged or not by the enlargement display unit based on information of the next image to be displayed, in a case where the image advancing is instructed by the image advancing instruction unit while the image is enlarged and displayed;
   a first image advancing control unit for controlling the enlargement display unit to display a second image without enlarging the second image, in a case where the image advancing is instructed while a first image is enlarged and displayed, and in a case where the determining unit determines not to enlarge the second image to be displayed after the first image; and
   a second image advancing control unit for controlling the enlargement display unit to enlarge and display a third image based on the enlargement information used for enlarging and displaying the first image and stored in the storing unit, in a case where the image advancing is instructed while the second image is displayed by the first image advancing control unit, and in a case where the determining unit determines to enlarge the third image to be displayed after the second image.

2. An image processing apparatus adapted to display plural images recorded on a recording medium, comprising:
   an enlargement display unit for enlarging and displaying an image recorded on the recording medium;
   a storing unit for storing enlargement information including an enlargement position used for enlarging and displaying the image;
   an image advancing instruction unit for instructing image advancing;
   a determining unit for determining whether a next image to be displayed should be enlarged or not by the enlargement display unit based on information of the next image to be displayed, in a case where the image advancing is instructed by the image advancing instruction unit while the image is enlarged and displayed;
   a first image advancing control unit for performing image advancing to a second image without enlarging the second image, in a case where the image advancing is instructed while a first image is enlarged and displayed, and in a case where the determining unit determines not to enlarge the second image to be displayed after the first image; and
   a second image advancing control unit controlling the enlargement display unit to enlarge and display a third image based on the enlargement information used for enlarging and displaying the first image and stored in the storing unit, in a case where the image advancing is further instructed after the image advancing to the second image is performed by the first image advancing control unit, and in a case where the determining unit determines to enlarge the third image to be displayed after the second image.

3. The image processing apparatus according to claim 2, wherein the determining unit determines not to enlarge the next image to be displayed, in at least either one of a case where the next image to be displayed is an image of a specific type or a case where the next image to be displayed is a damaged image.

4. The image processing apparatus according to claim 3, wherein the image of the specific type is a moving image.

5. The image processing apparatus according to claim 4, wherein, in a case where the determining unit determines not to enlarge the second image because the second image is a moving image, and in a case where the second image is displayed by the first image advancing control unit and the second image is reproduced as a moving image, the third image is displayed without being enlarged irrespective of the information of the third image to be displayed after the second image when the image advancing is instructed.

6. The image processing apparatus according to claim 2, wherein the second image advancing control unit control the enlargement display unit to enlarge and display the third image based on the enlargement position and enlargement magnification included in the enlargement information used for enlarging and displaying the first image and stored in the storing unit.

7. The image processing apparatus according to claim 2, further comprising an assignment unit for assigning a predetermined common member either one of functions of the enlargement position moving unit and the image advancing instruction unit, according to an operating state of the apparatus.

8. The image processing apparatus according to claim 7, wherein the image processing apparatus has, as an enlargement display mode, a normal mode in which the enlargement position moving unit functions and an enlarged image advancing mode in which the image advancing instruction unit functions, and
   wherein the assignment unit assigns the common member the function of the enlargement position moving unit in the normal mode, and assigns the common member the function of the image advancing instruction unit in the enlarged image advancing mode.

9. The image processing apparatus according to claim 7, wherein the image processing apparatus has, as an enlargement display mode, a normal mode in which the enlargement position moving unit functions and an enlarged image advancing mode in which the image advancing instruction unit functions, and wherein the image processing apparatus further comprises a guidance display unit for displaying a guidance as to which one of the enlargement display mode is selected.

10. The image processing apparatus according to claim 2, wherein an operation member for the enlargement position moving unit and an operation member for the image advancing instruction unit are separately provided, and wherein both an operation by the operation member for the enlargement position moving unit and an operation by the operation member for the image advancing instruction unit are possible in the enlargement display mode of the image processing apparatus.

11. The image processing apparatus according to claim 8, wherein the enlargement display mode is not cancelled even in a case where an image has been deleted during the image advancing performed by the image advancing control unit after a mode is shifted to the enlargement display mode in which the enlargement display unit functions.

12. The image processing apparatus according to claim 2, wherein the second image advancing control unit calculates the enlargement position from a ratio of a whole image in a case where a size of the first image is different from a size of the third image.

13. The image processing apparatus according to claim 2, wherein the second image advancing control unit calculates the enlargement position from a ration of a whole image in a case where a rotation angle of the first image is different from a rotation angle of the third image.

14. The image processing apparatus according to claim 7, wherein, in a case where a number of images recorded on the recording medium is one, the assignment by the assignment unit is restricted.

15. The image processing apparatus according to claim 2, further comprising an image pickup unit for picking-up an object and obtain an image, wherein the image recorded on the recording medium is the image obtained by the image pickup unit.

16. The image processing apparatus according to claim 2, further comprising an updating unit for updating the enlargement information stored in the storing unit when the enlargement position of the enlarged and displayed image is moved by the enlargement position moving unit, wherein the updating unit does not update the enlargement information stored in the storing unit even if the image advancing is performed by the first image advancing control unit or the second image advancing control unit.

17. An image displaying method for an image processing apparatus adapted to display plural images recorded on a recording medium, comprising:

an enlarging and displaying step of enlarging and displaying an image recorded on the recording medium;

a storing step of storing enlargement information including an enlargement position used for enlarging and displaying the image;

an enlargement position moving step of moving the enlargement position of the enlarged and displayed image;

an image advancing instruction step of instructing image advancing;

a determining step of determining whether a next image to be displayed should be enlarged or not by the enlarging and displaying step based on information of the next image to be displayed, in a case where the image advancing is instructed by the image advancing instruction step while the image is enlarged and displayed;

a first image advancing step to perform the image advancing to a second image without enlarging the second image, in a case where the image advancing is instructed while a first image is enlarged and displayed, and in a case where the determining step determines not to enlarge the second image to be displayed after the first image; and a second image advancing step to control the image processing apparatus to enlarge and display a third image based on the enlargement information used for enlarging and displaying the first image and stored in the storing step, in a case where the image advancing is further instructed after the image advancing to the second image is performed by the first image advancing step, and in a case where the determining step determines to enlarge the third image to be displayed after the second image.

18. A storage medium having program code stored thereupon and executable by an image processing apparatus to perform the method according to claim 17.

* * * * *